(12) United States Patent
Garoosi

(10) Patent No.: US 10,363,178 B2
(45) Date of Patent: Jul. 30, 2019

(54) MOTOR VEHICLE WITH A MOBILE VEHICLE SEAT

(71) Applicant: FORD MOTOR COMPANY, Dearborn, MI (US)

(72) Inventor: Mahdi Garoosi, Cologne (DE)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 15/911,896

(22) Filed: Mar. 5, 2018

(65) Prior Publication Data
US 2018/0271724 A1 Sep. 27, 2018

(30) Foreign Application Priority Data

Mar. 27, 2017 (DE) .................. 10 2017 205 080

(51) Int. Cl.
B62K 13/00 (2006.01)
A61G 3/08 (2006.01)
A61G 5/04 (2013.01)
B62K 11/00 (2006.01)
B60N 2/24 (2006.01)
(Continued)

(52) U.S. Cl.
CPC ............ *A61G 3/0808* (2013.01); *A61G 5/04* (2013.01); *A61G 5/128* (2016.11); *B60N 2/01508* (2013.01); *B60N 2/01591* (2013.01); *B60N 2/245* (2013.01); *B60N 2/32* (2013.01); *B62J 1/00* (2013.01); *B62K 11/007* (2016.11); *B62K 13/00* (2013.01)

(58) Field of Classification Search
CPC .................................................. A61G 3/0808
See application file for complete search history.

(56) References Cited

U.S. PATENT DOCUMENTS 4,268,054 A 5/1981 Twitchell et al.
4,520,893 A 6/1985 Keough
(Continued)

FOREIGN PATENT DOCUMENTS

DE 202015106647 U1 1/2016
EP 2979964 A1 2/2016
(Continued)

OTHER PUBLICATIONS

DE Examination Report for DE 10 2017 205 080.2 dated Oct. 11, 2017, 6 pages.

Primary Examiner — James A Shriver, II
Assistant Examiner — James J Triggs
(74) Attorney, Agent, or Firm — Brandon Hicks; Brooks Kushman P.C.

(57) ABSTRACT

The disclosure concerns a motor vehicle with a mobile vehicle seat. The seat includes a frame that forms a seating surface and a backrest. An energy source is arranged in the frame. A drive motor is arranged in the frame and connected to the energy source. At least one wheel is arranged on the frame and in drive connection with the drive motor. A control device controls the drive motor, and a first coupling is arranged on the frame to releasably fix the frame to the motor vehicle. A second coupling corresponding to the first coupling of the vehicle seat is arranged on an inside of a vehicle door, which is mounted pivotably on a vehicle superstructure. The second coupling can be brought into releasable engagement with the first coupling of the vehicle seat.

18 Claims, 8 Drawing Sheets

(51) Int. Cl.
*B60N 2/32* (2006.01)
*A61G 5/12* (2006.01)
*B62J 1/00* (2006.01)
*B60N 2/015* (2006.01)

(56) References Cited

U.S. PATENT DOCUMENTS

| | | | |
|---|---|---|---|
| 4,566,842 A * | 1/1986 | Clarke | A61G 3/0209 414/462 |
| 5,466,111 A | 11/1995 | Meyer | |
| 5,489,170 A | 2/1996 | Inoue et al. | |
| 7,481,445 B1 * | 1/2009 | Danziger | A61G 5/08 280/250.1 |
| 8,490,723 B2 | 7/2013 | Heinzmann et al. | |
| 2002/0038967 A1 | 4/2002 | Brandler | |
| 2006/0193708 A1 | 8/2006 | Ditch et al. | |
| 2011/0002764 A1 * | 1/2011 | Darnell | A61G 3/0808 414/550 |
| 2015/0015765 A1 | 6/2015 | Sherwood et al. | |
| 2016/0310333 A1 | 10/2016 | Maeshiro et al. | |

FOREIGN PATENT DOCUMENTS

| | | |
|---|---|---|
| GB | 2539627 A | 12/2016 |
| WO | 20150157653 A1 | 10/2015 |
| WO | 2016001451 A1 | 1/2016 |

\* cited by examiner

MOTOR VEHICLE WITH A MOBILE VEHICLE SEAT

CROSS-REFERENCE TO RELATED APPLICATIONS

This application claims foreign priority benefits under 35 U.S.C. § 119(a)-(d) to DE Application 10 2017 205 080.2 filed Mar. 27, 2017, which is hereby incorporated by reference in its entirety.

TECHNICAL FIELD

The present disclosure relates to a motor vehicle with a mobile vehicle seat.

BACKGROUND

U.S. Pat. No. 4,520,893 describes an electrically powered wheelchair that can be used as a driver's seat in a motor vehicle. For this, the wheelchair, which is driven into the vehicle via a ramp, is anchored to a vehicle superstructure at a conventional position of a driver's seat that has been removed from the vehicle. In the anchoring position, the wheelchair is oriented against a forward travel direction of the motor vehicle so that a backrest of the wheelchair faces controls of the motor vehicle, such as for example a steering wheel or a pedal unit. Accordingly, a wheelchair seat is mounted on the wheelchair to be rotatable about a vertical axis so that a person sitting on the wheelchair seat, by turning the seat through 180°, can turn to face the controls of the motor vehicle in order to operate these.

US 2002/0038967 A1 discloses a mobile child seat that can be fixed in the vehicle. The child seat has two wheels arranged rotatably on an axle, and a handle for tipping the child seat, in the state removed the vehicle, about the rotation axis of the wheels and thus being able to transport it in rolling fashion.

EP 2 539 216 B1 describes for example a motorized vehicle that is balanced dynamically in the manner of a Segway, with two wheels arranged spaced apart on an axle.

U.S. Pat. No. 5,489,170 discloses a wheelchair with a fixing device for fixing the wheelchair to a vehicle floor of the vehicle.

US 2006/0193708 A1 also discloses a device with several straps for fixing one or more wheelchairs in the vehicle.

DE 20 2015 106 647 U1 describes a mobile transport device with an armchair-like seating device of a motor vehicle and a leg-like advancing device, driven electrically or hydraulically. In this way, the transport device allows autonomous transport of the person out of a vehicle, without disembarkation, to a destination remote from the vehicle.

SUMMARY

In this context, the present disclosure is based on the object of providing a motor vehicle with a mobile vehicle seat, which allows the transfer of a person out of the motor vehicle and away from the motor vehicle to a remote destination and vice versa, without the need to leave the seat. In addition, the present disclosure is based on the object of providing a mobile vehicle seat for a motor vehicle that allows the transport of a person away from the motor vehicle to a remote destination and vice versa.

It is pointed out that the features listed individually in the claims may be combined with each other in any technically sensible fashion and disclose further embodiments of the disclosure. The description characterizes and specifies the disclosure further, in particular in connection with the Figures.

According to the disclosure, a motor vehicle has a mobile vehicle seat. This is characterized in that the seat comprises a frame that forms a seating surface and a backrest, an energy source arranged in the frame, a drive motor arranged in the frame and connected to the energy source, at least one wheel arranged on the frame and in drive connection with the drive motor, a control device to control the drive motor, and a first coupling arranged on the frame to releasably fix the frame to the motor vehicle. Furthermore, a second coupling corresponds to the first coupling of the vehicle seat is arranged on an inside of a vehicle door, which is mounted pivotably on a vehicle superstructure. The second coupling can be brought into releasable engagement with the first coupling of the vehicle seat arranged on the frame of the vehicle seat. In this way, the mobile vehicle seat can be moved out of, or into, the motor vehicle by pivot movements of vehicle doors on their opening or closing, without a person sitting in the vehicle seat having to leave the seat. Also, the mobile vehicle seat, in a state removed from the motor vehicle, allows autonomous transport of persons and/or objects away from the motor vehicle to a remote destination and vice versa, which is of great advantage in particular for older persons and/or persons with restricted independent mobility.

An advantageous embodiment of the disclosure provides that the second coupling arranged on the vehicle door can be displaced in a height direction and/or in longitudinal direction on an inside of a vehicle door. For this, the vehicle door may have a corresponding adjustment mechanism driven electrically, hydraulically or pneumatically. In this way, positional differences, for example height differences between a position of the vehicle seat received in the vehicle and a position of the vehicle seat outside the vehicle, can be compensated, which substantially simplifies transport of the vehicle seat into and out of the motor vehicle. In addition, a seating position of the vehicle seat in the motor vehicle may be adapted individually according to the needs of vehicle occupants, for example in the longitudinal direction, in order to be able to move the vehicle seat in the motor vehicle forward or backward.

According to a further advantageous embodiment of the disclosure, in front of a seating surface of the vehicle seat, a footrest is provided that is mounted on the frame so as to be movable and/or pivotable between a usage position and a non-usage position. In the usage position, the footrest receives firstly feet of a person sitting on the seating surface and secondly feet of a person standing on the footrest. In the non-usage position, the footrest can advantageously be moved and/or swiveled out of a foot area so that feet can be placed on a vehicle floor when the vehicle seat is installed in the motor vehicle, or used for unhindered operation of controls arranged in the motor vehicle, for example a pedal unit. Advantageously, in the non-usage position, the footrest is received in a contour of the vehicle seat, i.e. for example pushed into the vehicle seat or pivoted close to an outer contour of the vehicle seat.

Advantageously, in its usage position, the footrest allows use of the vehicle seat, in the state removed from the motor vehicle, as a transporter in two different ways. Firstly, a person using the vehicle seat as a transporter may sit in the vehicle seat during transport and rest his/her feet on the footrest. Secondly, the person using the vehicle seat for transport may stand with his/her feet on the footrest and use the vehicle seat in the manner of a scooter for transport. Use of the vehicle seat as a scooter offers the further advantage that additional objects can be placed on the free seat surface and be transported at the same time as the person in a comfortable and secure fashion.

In order to further facilitate the transport of a person standing on the footrest with the vehicle seat, a further advantageous embodiment of the disclosure provides that a handle, which a person standing on the footrest can grip with his/her hands during transport, is provided on the frame at an upper end of the backrest of the vehicle seat.

For individual adaptation of the handle to the person using it, according to yet a further advantageous embodiment of the disclosure, the handle is adjustable in the height direction and/or in the longitudinal direction.

In a particularly compact design of the vehicle seat, the handle may be formed by a headrest of the vehicle seat.

A further advantageous embodiment of the disclosure provides that two wheels arranged spaced apart from each other on an axle, which are in drive connection with the drive motor, are provided on the frame, and the control device is configured to dynamically balance the vehicle seat during driving operation. In other words, the vehicle seat is formed only with a single axle and the control device responds autonomously to changes in the balance of the vehicle seat by active contra-steering, for example by corresponding actuation of the drive wheels, without active steering movements by a person using the vehicle seat as a transporter.

Preferably, the wheels of the mobile vehicle seat are driven electrically, i.e. the drive motor is preferably an electric motor that is fed from an energy source, for example a battery or an accumulator. Also, several drive motors may be provided, for example a separate drive motor may be assigned to each drive wheel. In this case, the control device is configured to actuate each drive motor.

Preferably, the mobile vehicle seat is a front seat of the motor vehicle.

According to a further aspect of the disclosure, a mobile vehicle seat for a motor vehicle is provided comprising a frame that forms a seating surface and a backrest, an energy source arranged in the frame, a drive motor arranged in the frame and connected to the energy source, at least one wheel arranged on the frame and in drive connection with the drive motor, a control device to control the drive motor, and a coupling arranged on the frame to releasably fix the frame to the motor vehicle. The coupling on the vehicle seat are configured to be brought into releasable engagement with a coupling on the vehicle door that is arranged on an inside of a vehicle door, which is mounted pivotably on a vehicle superstructure, so that the mobile vehicle seat can be attached releasably to the motor vehicle and transported into and out of the motor vehicle. A person sitting in the vehicle seat need not leave the vehicle seat for this.

Furthermore, in front of the seating surface of the vehicle seat, a footrest is provided that is mounted on the frame so as to be movable and/or pivotable between a usage position and a non-usage position, and in the usage position receives firstly feet of a person sitting on the seating surface and secondly feet of a person standing on the footrest. Such a mobile vehicle seat, in a state removed from the motor vehicle, allows autonomous transport of persons and/or objects from the motor vehicle to a remote destination and vice versa, which is of great advantage in particular for older persons and/or persons with restricted independent mobility.

According to a further advantageous embodiment of the disclosure, a handle, which a person standing on the footrest can grip with his/her hands, is provided on the frame at an upper end of the backrest. This facilitates the transport of a person standing on the footrest who is using the vehicle seat in the manner of a scooter for transport.

Yet a further advantageous embodiment of the disclosure provides that two wheels arranged on an axle and in drive connection with the drive motor are provided on the frame, and the control device is configured to dynamically balance the vehicle seat during driving operation. According to this compact embodiment, the mobile vehicle seat is formed only with one axle and the control device responds autonomously to changes in balance of the vehicle seat by active contra-steering, for example by corresponding actuation of the drive wheels, without active steering movements by a person using the vehicle seat as a transporter.

Further features and advantages of the disclosure arise from the following description of exemplary embodiments of the disclosure, which are not to be regarded limitatively, and are explained in more detail below with reference to the drawings.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various Figures, parts with equivalent function always carry the same reference sign, so these are usually only described once.

Figure 1:
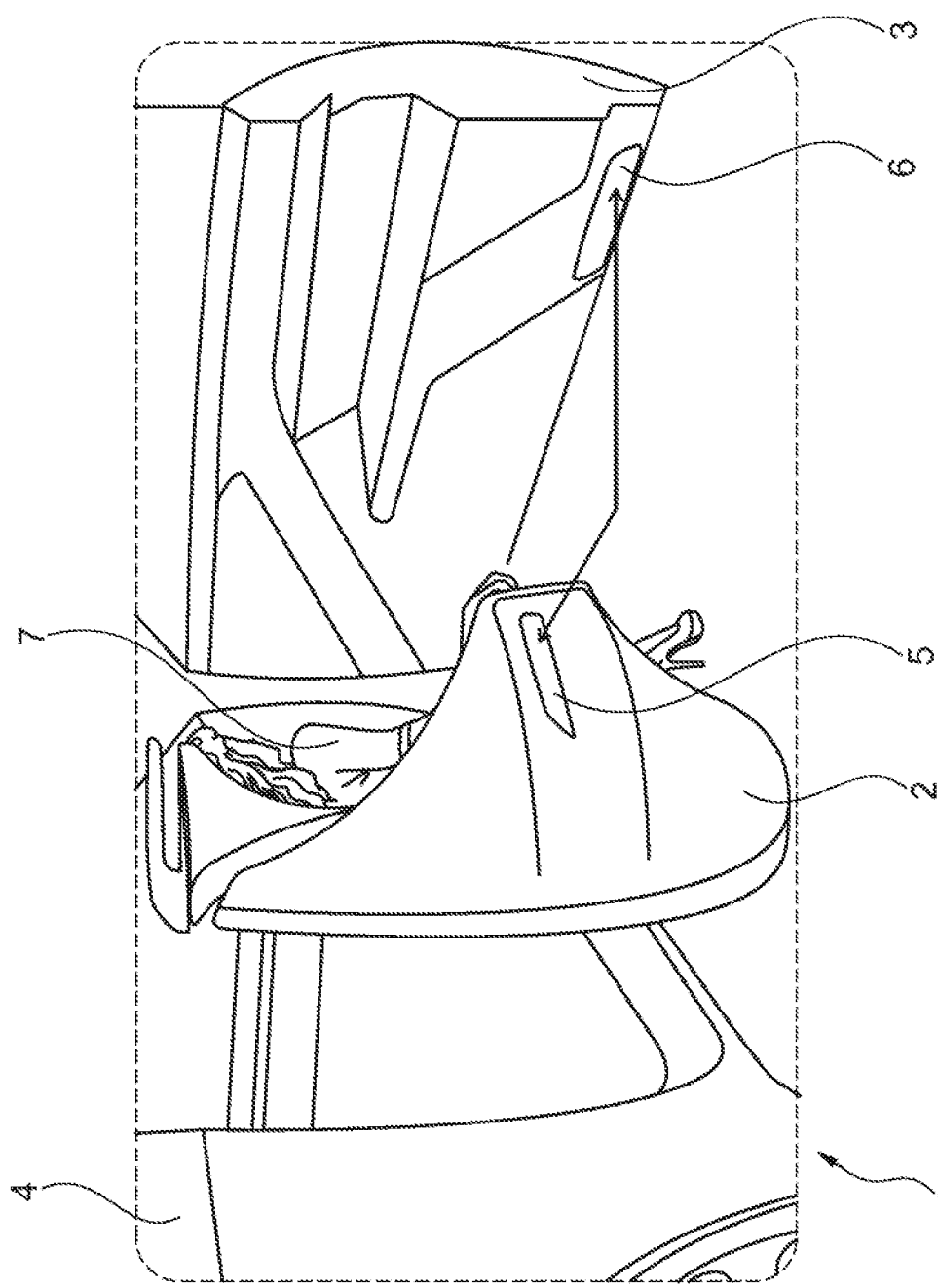
FIG. 1 is a partial view of an exemplary embodiment of a motor vehicle with a mobile vehicle seat according to the disclosure.

FIG. 1 shows a partial view of an exemplary embodiment of a motor vehicle 1 with a mobile vehicle seat 2 according to the disclosure. FIG. 1 shows a door region of the motor vehicle 1 in which a vehicle door 3 is mounted pivotably on a vehicle superstructure 4. As can be seen, the vehicle door 3 is in an open state so that an inside of the vehicle door 3 can be seen.

As also shown in FIG. 1, the mobile vehicle seat 2 is in a state removed from the motor vehicle 1 and placed next to this. A first coupling 5 to releasably fix the vehicle seat 2 to the motor vehicle 1 is depicted diagrammatically at a side on the vehicle seat 2. A second coupling 6 is arranged on the inside of the vehicle door 3. The first coupling 5 on the vehicle seat correspond to the second coupling 6 on the vehicle door, such that the first and second couplings 5, 6 can be brought into releasable engagement with each other. In this way, the vehicle seat 2 can be securely connected to the motor vehicle 1 or the vehicle door 3, and attached releasably thereto so that the vehicle seat 2 together with the vehicle door 3 can be swiveled into and out of the motor vehicle 1 without a person 7 sitting in the vehicle seat 2 having to leave the vehicle seat 2.

As also indicated in FIG. 1, the second coupling 6 arranged on the inside of the vehicle door 3 is displaceable both in a height direction and in a longitudinal direction on the inside of the vehicle door 3, in order to guarantee the greatest possible flexibility on transport of the vehicle seat 2 into or out of the motor vehicle 1.

The mobile vehicle seat 2 used in the motor vehicle 1 is now explained in more detail with reference to FIGS. 2 to 8.

Figure 2:
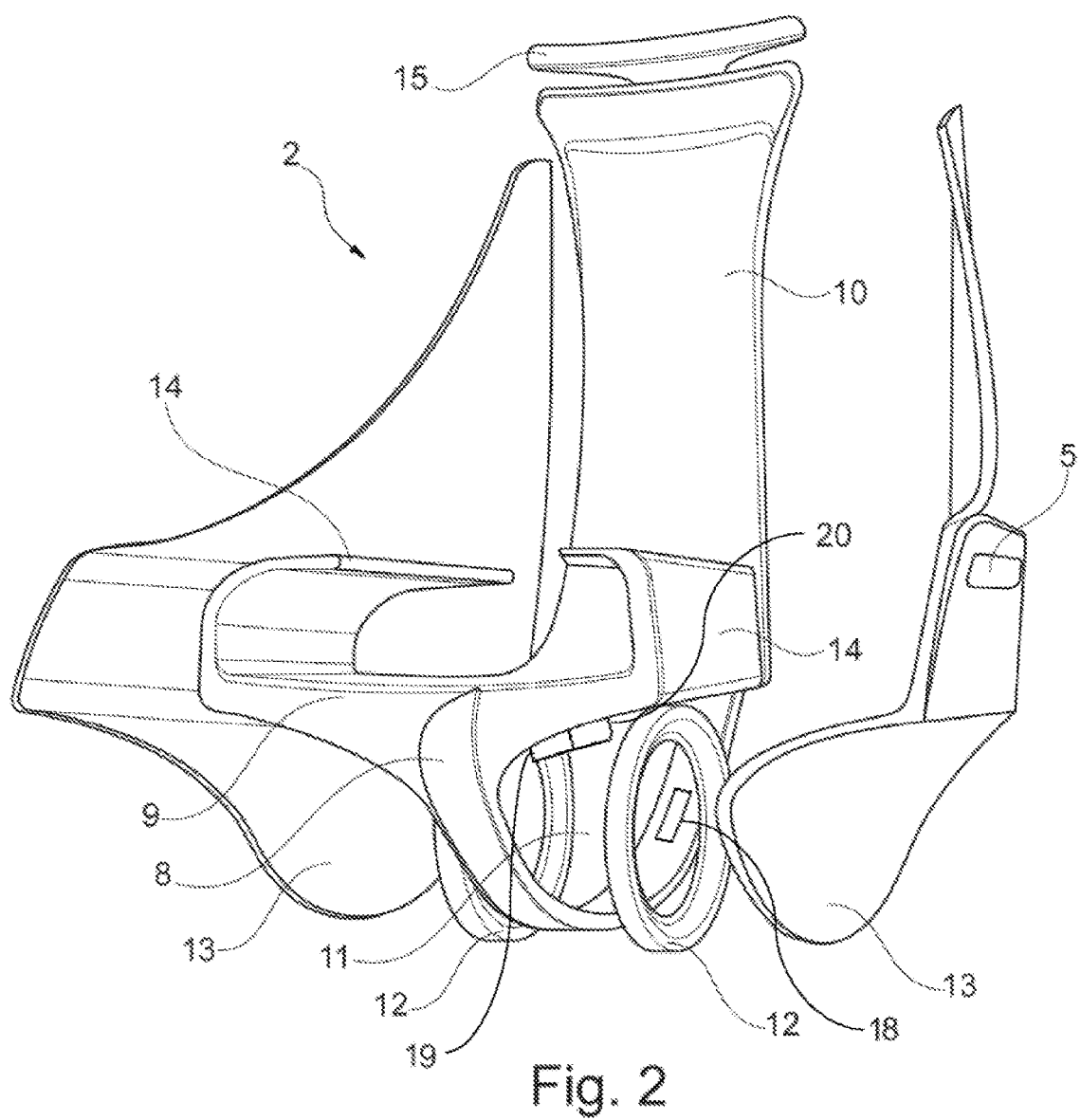
FIG. 2 depicts the mobile vehicle seat from FIG. 1 in a perspective exploded view.

FIG. 2 shows the mobile vehicle seat 2 from FIG. 1 in a perspective exploded view. The vehicle seat 2 has a frame 8 that forms a seating surface 9 and a backrest 10. Furthermore, an energy source 20, for example a battery or an accumulator, and a drive motor 19, for example an electric motor, are arranged in the frame 8, wherein the drive motor is connected to the energy source. A preferred site for arrangement of the energy source and drive motor is indicated with reference sign 11.

FIG. 2 also shows that two wheels 12, arranged spaced apart from each other on an axle, are provided on the frame 8. The wheels 12 stand in drive connection with the drive motor. In the vehicle seat 2 depicted, the drive motor is controlled by a control device 18. In particular, with the single-axle vehicle seat 2 depicted, the control device is configured to balance the vehicle seat 2 dynamically during drive operation. For this, the control device reacts autonomously to changes in the balance of the vehicle seat 2 by active contra-steering, for example by corresponding actuation of the drive wheels 12, without active steering movements by a person using the vehicle seat 2 as a transporter.

Furthermore, as shown in FIG. 2, two shell elements 13, in particular hard-shell elements, are attached to sides of the frame 8. The shell elements 13 may for example be made of plastic. Here, the shell elements 13 are considered as belonging to the frame 8. On each side of the vehicle seat 2, the shell element 13 or the frame 8 comprises the first coupling 5 for releasable fixing of the frame 8 to the motor vehicle 1 (FIG. 1). In this way, the vehicle seat 2 can be transported into or out of the motor vehicle 1 both on a driver's side and on a passenger's side. As already described in connection with the explanation of FIG. 1, the first coupling 5 on the vehicle seat is configured to be brought into releasable engagement with the second coupling 6 of the vehicle door (FIG. 1), in order to be able to fix the vehicle seat 2 releasably to the motor vehicle 1, and be able to transport the vehicle seat 2 into or out of the motor vehicle 1.

Furthermore, the frame 8 of the vehicle seat 2 shown in FIG. 2 forms two armrests 14. A control device 18 may be integrated in one of the armrests 14, using the control device, a person 7 sitting in the vehicle seat 2 may for example control a transport process of the seat 2 into or out of the vehicle 1 using the second coupling 6, which is arranged on the inside of the vehicle door 3 so as to be displaceable in the height and longitudinal directions (FIG. 1), and/or to control the advance movement of the vehicle seat 2.

As also shown in FIG. 2, a handle 15 is provided on the frame 8 at an upper end of the backrest 10 of the vehicle seat 2. In the exemplary embodiment of the vehicle seat 2 shown, the handle 15 is adjustable at least in the longitudinal direction.

Figure 3:
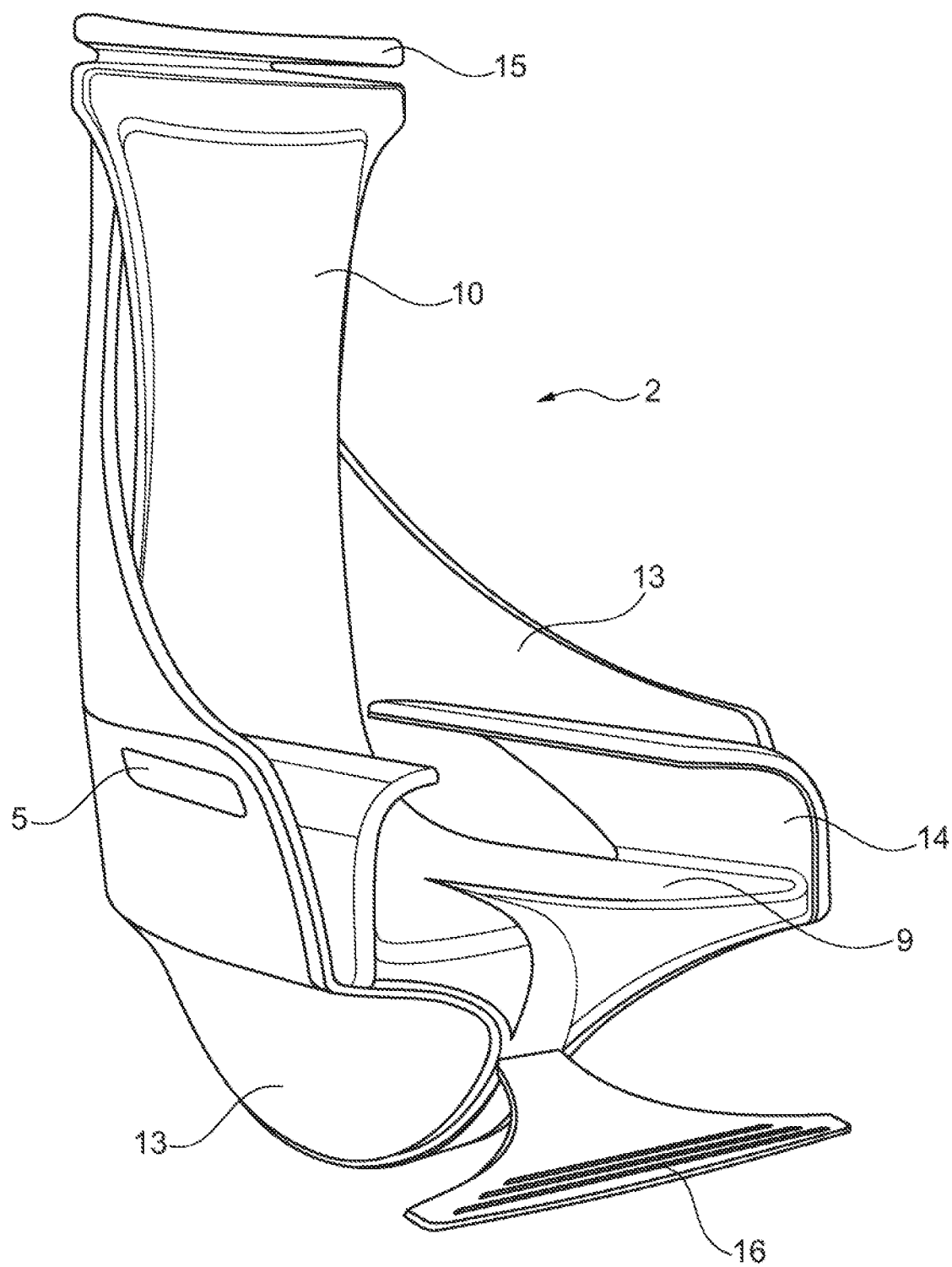
FIG. 3 is a perspective view of the mobile vehicle seat from FIG. 2 viewed obliquely from the front.

FIG. 3 shows a perspective view of the mobile vehicle seat 2 from FIG. 2 obliquely from the front. In FIG. 3, a footrest 16 is arranged in front of the seating surface 9 of the vehicle seat 2. The footrest 16 is mounted on the frame 8 so as to be displaceable and/or pivotable between a usage position and a non-usage position. FIG. 3 shows the footrest 16 in its usage position.

Figure 4:
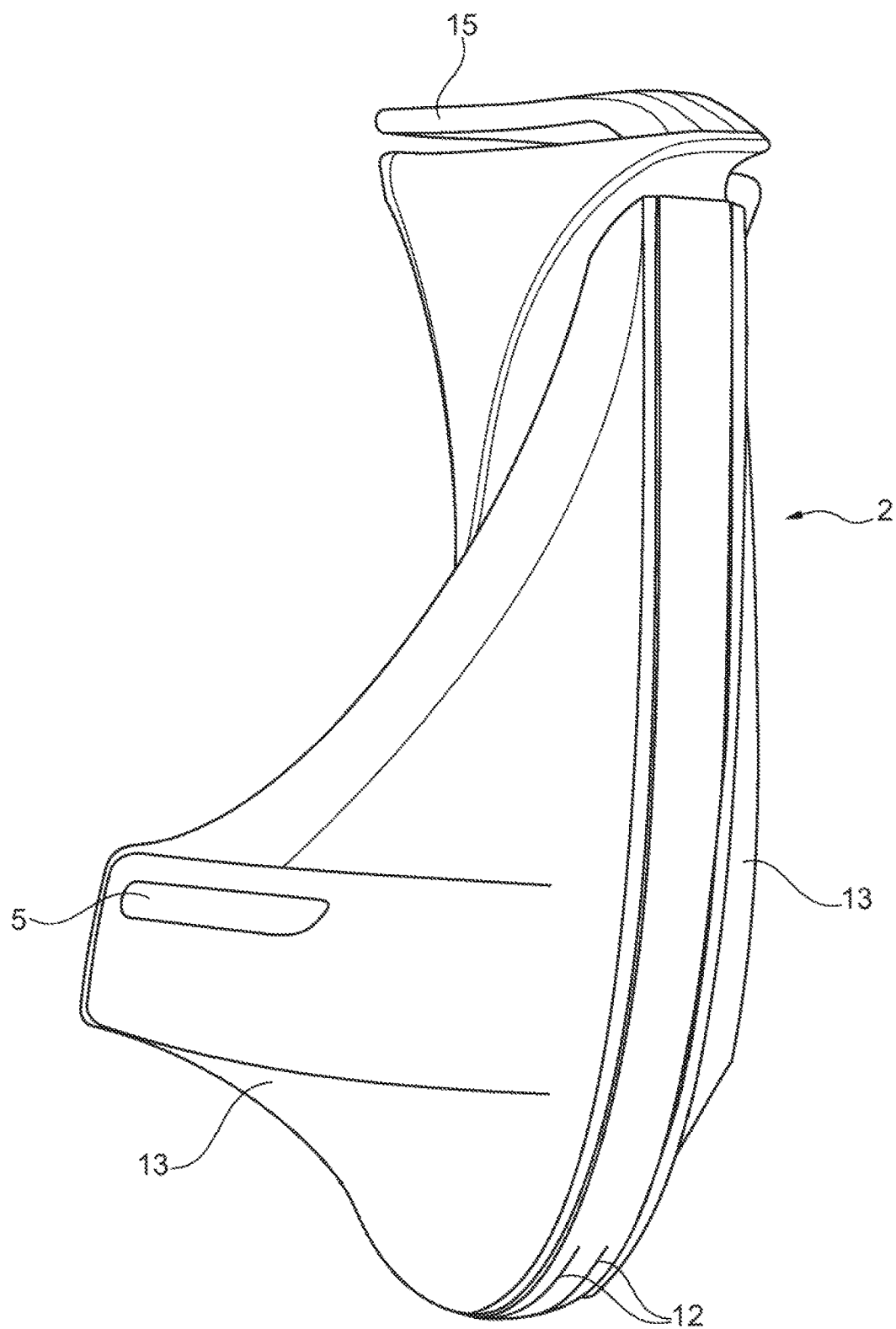
FIG. 4 is a perspective view of the mobile vehicle seat from FIG. 2 viewed obliquely from behind.

FIG. 4 depicts a perspective view of the mobile vehicle seat 2 from FIG. 2 obliquely from behind.

Figure 5:
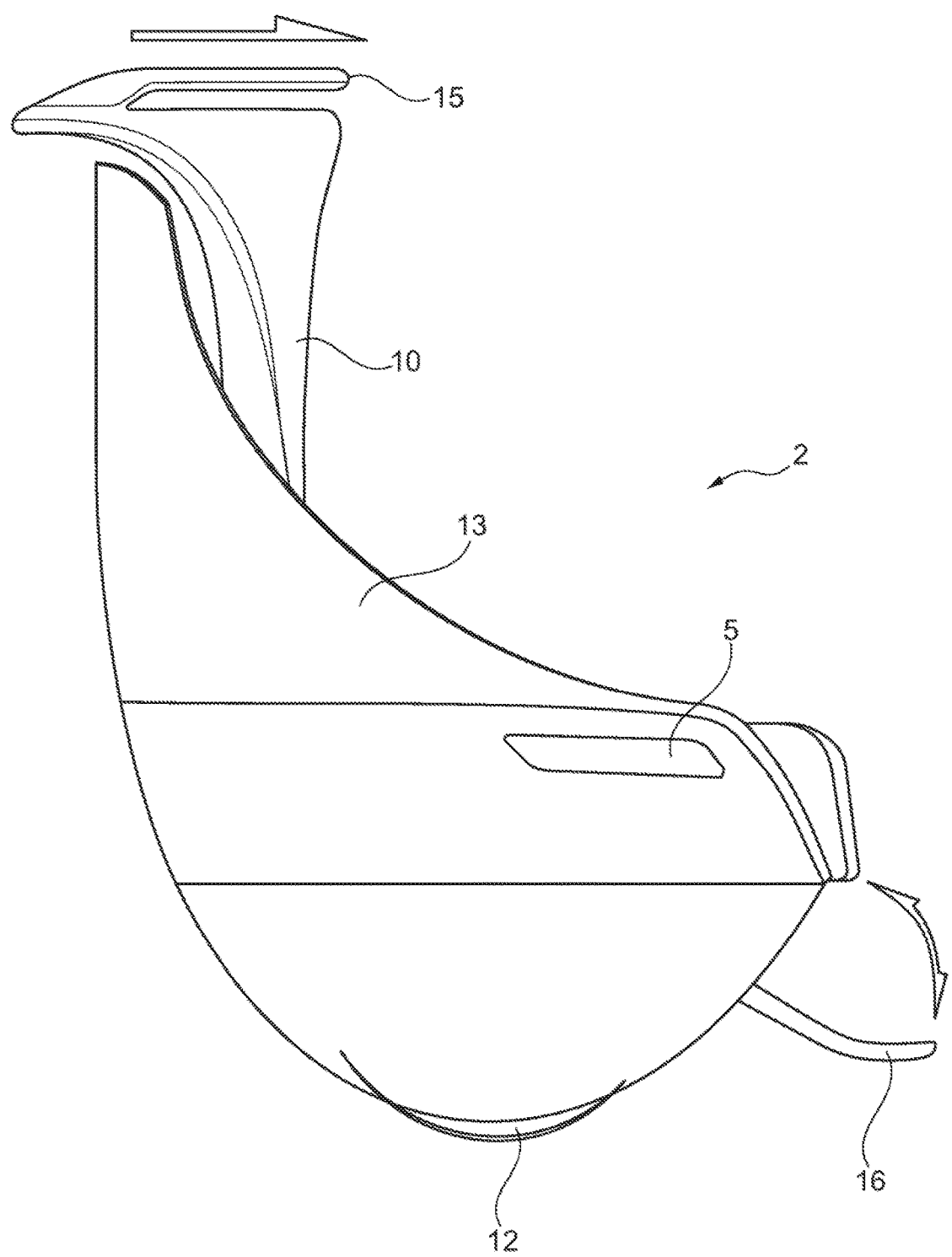
FIG. 5 is a side view of a first side of the mobile vehicle seat from FIG. 2.

FIG. 5 shows a side view of a first side of the mobile vehicle seat 2 from FIG. 2. In FIG. 5, the movability of the handle 15 on the vehicle seat 2 in the longitudinal direction is depicted by a movement arrow arranged on the handle 15. Similarly, a movement arrow arranged on the footrest 16 indicates the pivotability of the footrest 16 on the vehicle seat 2. FIG. 5 shows the footrest 16 in its usage position.

Figure 6:
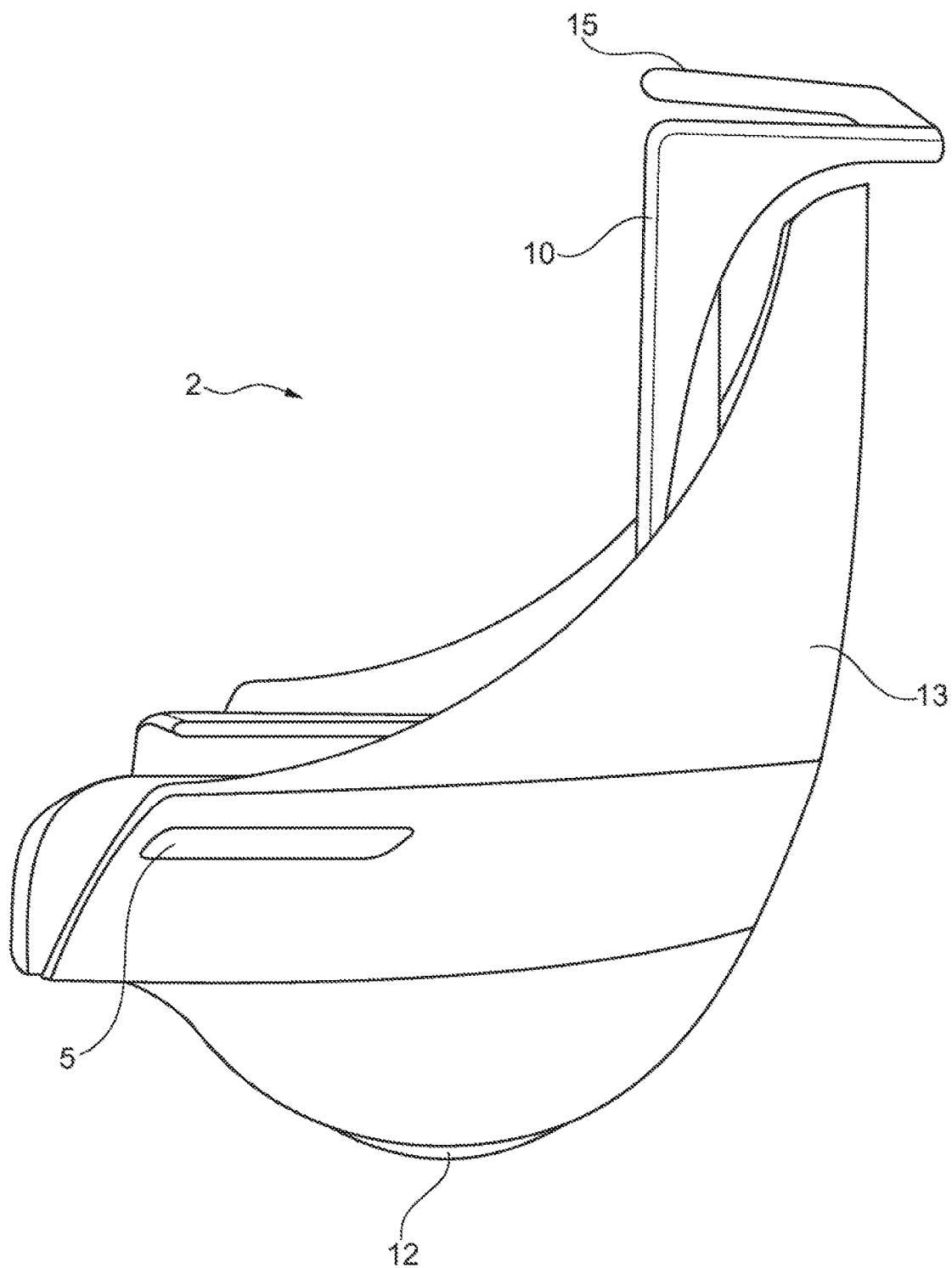
FIG. 6 is a side view of the other side of the mobile vehicle seat from FIG. 2.

FIG. 6 shows a side view of the other side of the mobile vehicle seat 2 from FIG. 2. In this depiction, the footrest 16 cannot be seen since it is in its non-usage position and is received in the contour of the vehicle seat 2.

Figure 7:
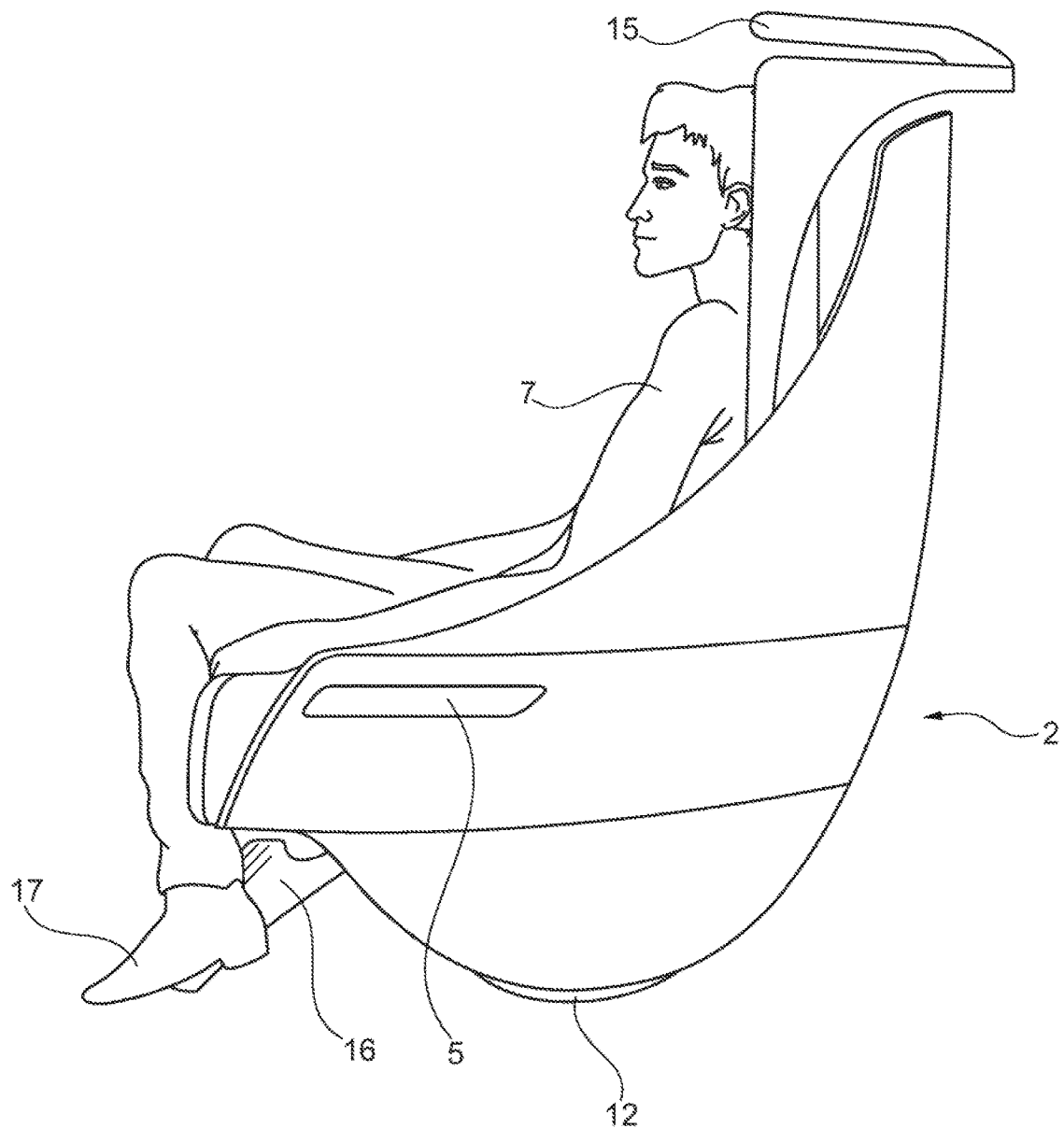
FIG. 7 depicts a first transport possibility of a person sitting in the vehicle seat from FIG. 2.

FIG. 7 depicts a first transport possibility of the person 7 sitting in the vehicle seat 2 from FIG. 2. As FIG. 7 shows, the footrest 16 is in its usage position and receives the feet 17 of the person 7 sitting on the seating surface 9.

Figure 8:
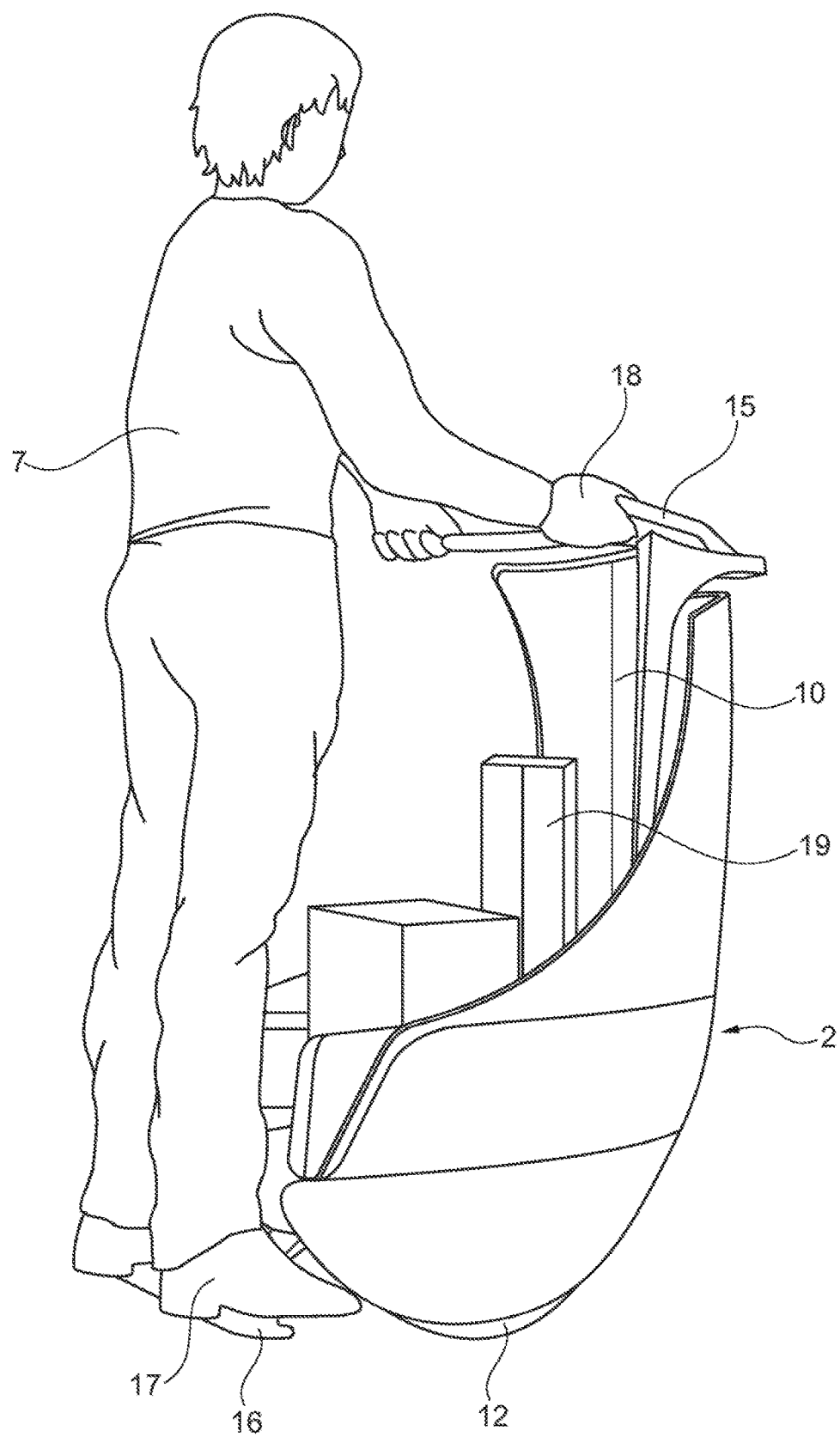
FIG. 8 depicts a second transport possibility of a person standing on a footrest of the vehicle seat from FIG. 2.

FIG. 8 depicts a second transport possibility of the person 7 standing on the footrest 16 of the vehicle seat 2 from FIG. 2. For the use of the vehicle seat 2 in the manner of the scooter, as shown, the footrest 16 is also in its usage position. The person 7 here grips the handle 15 with his/her hands 18. As FIG. 8 also shows, other objects 19 to be transported are placed on the free seating surface 9 of the vehicle seat 2.

The motor vehicle according to the disclosure and the mobile vehicle seat according to the disclosure have been explained in detail with reference to an exemplary embodiment shown in the figures. The motor vehicle and the mobile vehicle seat are not however restricted to the embodiment described herein, but also comprise further embodiments with similar function.

In the preferred embodiment, the mobile vehicle seat according to the disclosure is used in a motor vehicle.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A motor vehicle having a mobile vehicle seat, the mobile vehicle seat comprising:
   a frame that forms a seating surface and a backrest;
   an energy source arranged in the frame;
   a drive motor arranged in the frame and connected to the energy source;
   a control device to control the drive motor;
   a first coupling arranged on the frame that releasably fixes the frame to the motor vehicle;
   a second coupling corresponding to the first coupling seating surface arranged on an inside of a vehicle door that is mounted pivotably on a vehicle superstructure, wherein the second coupling releasably engages with the first coupling of the frame of the seating surface;
two wheels arranged on an axle and in drive connection with the drive motor provided on the frame, wherein the control device is configured to dynamically balance a vehicle seat using the two wheels during driving operation.

2. The motor vehicle as claimed in claim 1, wherein the second coupling arranged on the vehicle door is displaceable in a height direction and in a longitudinal direction on an inside of the vehicle door.

3. The motor vehicle as claimed in claim 1 further comprising a footrest mounted on the frame in front of the seating surface, such that the footrest is pivotable between a usage position and a non-usage position, wherein in the usage position, the footrest is configured to receive feet of a person while sitting on the seating surface and to alternatively receive feet of a person while standing on the footrest behind the seating surface.

4. The motor vehicle as claimed in claim 3 further comprising a handle configured for hand gripping by a person standing on the footrest, the handle provided on the frame at an upper end of the backrest of the seating surface.

5. The motor vehicle as claimed in claim 4, wherein the handle is adjustable in a height direction and in a longitudinal direction.

6. The motor vehicle as claimed in claim 4, wherein the handle is formed by a headrest.

7. A mobile vehicle seat comprising:
a frame that forms a seating surface and a backrest;
an energy source arranged in the frame;
a drive motor arranged in the frame and connected to the energy source;
a control device to control the drive motor; and
a first coupling arranged on the frame that releasably fixes the frame to a vehicle, wherein, in front of the seating surface, a footrest is provided that is mounted on the frame and pivotable between a usage position and a non-usage position such that, in the usage position, the footrest is configured to receive feet of a person while sitting on the seating surface and while standing on the footrest behind the seating surface.

8. The mobile vehicle seat as claimed in claim 7 further comprising a handle configured for hand gripping by a person standing on the footrest, the handle provided on the frame at an upper end of the backrest.

9. The mobile vehicle seat as claimed in claim 8, wherein the handle is adjustable in a height direction and in a longitudinal direction.

10. The mobile vehicle seat as claimed in claim 8, wherein the handle is formed by a headrest at the upper end of the backrest.

11. The mobile vehicle seat as claimed in claim 7 further comprising a second coupling, arranged on a door such that the second coupling releasably engages the first coupling to pivot the seating surface with the door.

12. The mobile vehicle seat as claimed in claim 11, wherein the second coupling is displaceable in a height direction and in a longitudinal direction on the inside of the door.

13. The mobile vehicle seat as claimed in claim 7 further comprising two wheels, arranged on an axle and in drive connection with the drive motor, wherein the control device is configured to dynamically balance the seating surface during driving operation.

14. A vehicle seat comprising:
a frame that forms a seating surface;
a first coupling arranged on the frame that releasably fixes the frame to a vehicle;
a second coupling corresponding to the first coupling and arranged on an inside of a door that is mounted pivotably on a vehicle, wherein the second coupling releasably engages with the first coupling of the vehicle seat arranged on the frame of the vehicle seat; and
two wheels arranged on an axle provided on the frame, wherein a control device is configured to dynamically balance the seating surface during driving operation.

15. The vehicle seat as claimed in claim 14 further comprising a handle provided on the frame at an upper end of a backrest of the frame.

16. The vehicle seat as claimed in claim 15, wherein the handle is adjustable in a height direction.

17. The vehicle seat as claimed in claim 14 further comprising a footrest mounted on the frame in front of the seating surface such that the footrest is pivotable between a usage position and a non-usage position, wherein in the usage position, the footrest is configured to receive feet of a person while sitting on the seating surface or while standing behind the seating surface.

18. The vehicle seat as claimed in claim 14, wherein the second coupling is displaceable in a height direction and in a longitudinal direction on the inside of the door.

* * * * *